United States Patent [19]

Nock

[11] Patent Number: 4,738,221

[45] Date of Patent: Apr. 19, 1988

[54] BIRD FEEDER

[75] Inventor: Robert K. Nock, West Midlands, England

[73] Assignee: Silverthorne-Gillott Limited, Dudley, England

[21] Appl. No.: 861,509

[22] Filed: May 9, 1986

[30] Foreign Application Priority Data

Jun. 7, 1985 [GB] United Kingdom ................. 8514502

[51] Int. Cl.$^4$ .............................................. A01K 39/01
[52] U.S. Cl. ..................................... 119/18; 119/52 R
[58] Field of Search ...................... 119/52 R, 52 B, 53, 119/68, 69, 17, 18; D30/13; 222/457, 586, 585, 279, 289; 220/855 P, 72

[56] References Cited

U.S. PATENT DOCUMENTS

| D. 138,103 | 6/1944 | Setzer | D30/13 |
|---|---|---|---|
| 1,891,042 | 12/1932 | Benoit | D30/13 X |
| 2,683,440 | 7/1954 | Klix | 119/52 R |
| 2,789,534 | 4/1957 | Landgraf | 119/53 X |
| 3,717,126 | 2/1973 | Falcone et al. | 119/52 R |
| 4,285,301 | 8/1981 | Voss | 119/17 |
| 4,574,738 | 3/1986 | Tominaga | 119/18 |

Primary Examiner—Alfred C. Perham
Assistant Examiner—Richard E. Chilcot, Jr.
Attorney, Agent, or Firm—Charles O. Marshall, Jr.

[57] ABSTRACT

A bird feeder is shown in FIG. 1 comprising a bottle-like container adapted to be hung from a tree with a reversible cap engageable with the container. In one position the cap closes the container against egress of contents, for example in transport and storage, and in the reversed position allows controlled discharge of contents for bird feeding purposes.

2 Claims, 2 Drawing Sheets

BIRD FEEDER

This invention relates to bird feeders.

According to the invention a bird feeder comprises a container for food and a reversible lid for the container, means being provided for securing the container and lid together in either of the lid positions, in one position the lid preventing escape of container contents, and in the other position permitting escape of contents.

Conveniently the container is in the form of a bottle, that is to say it has a relatively narrow neck which co-operates with the lid, and the bottle may be blow moulded from a plastics material so as to be relatively inexpensive. By these means, the invention may be applied to packages containing bird food for retail sale, without substantially increasing the price of the container which is necessary for that purpose.

The lid may comprise a peripheral wall of substantially the same cross sectional shape and dimension as the major portion of the container, and with a transversely extending web or partition formed on one side with a closure cap for the container, so that when the lid is engaged with the container with that cap adjacent the container it closely fits the same to hold the contents against discharge. The opposite side of the partition can be fashioned to co-operate with the mouth of the container so as to allow gravity feed of container contents between the mouth of the container and the partition, and the peripheral wall of the lid may be provided with access apertures so that birds e.g. wild birds can reach the food through the apertures.

According to a feature of the invention, the container and lid are adapted to be snap engaged together by co-operating means provided on the container and lid and the same means are provided not only at both ends of the lid, so that the same can be reversed and engaged with the container, but also at both ends of the container. By these means a series of like lids and containers can be engaged together end to end. This is particularly advantageous when birds are being fed with different kinds of food which are not mixed, so that one container can be used for feeding one kind of food and the next adjacent one for another kind of food and so on.

The invention is now more particularly described with reference to the accompanying drawing in which.

Figure 1:
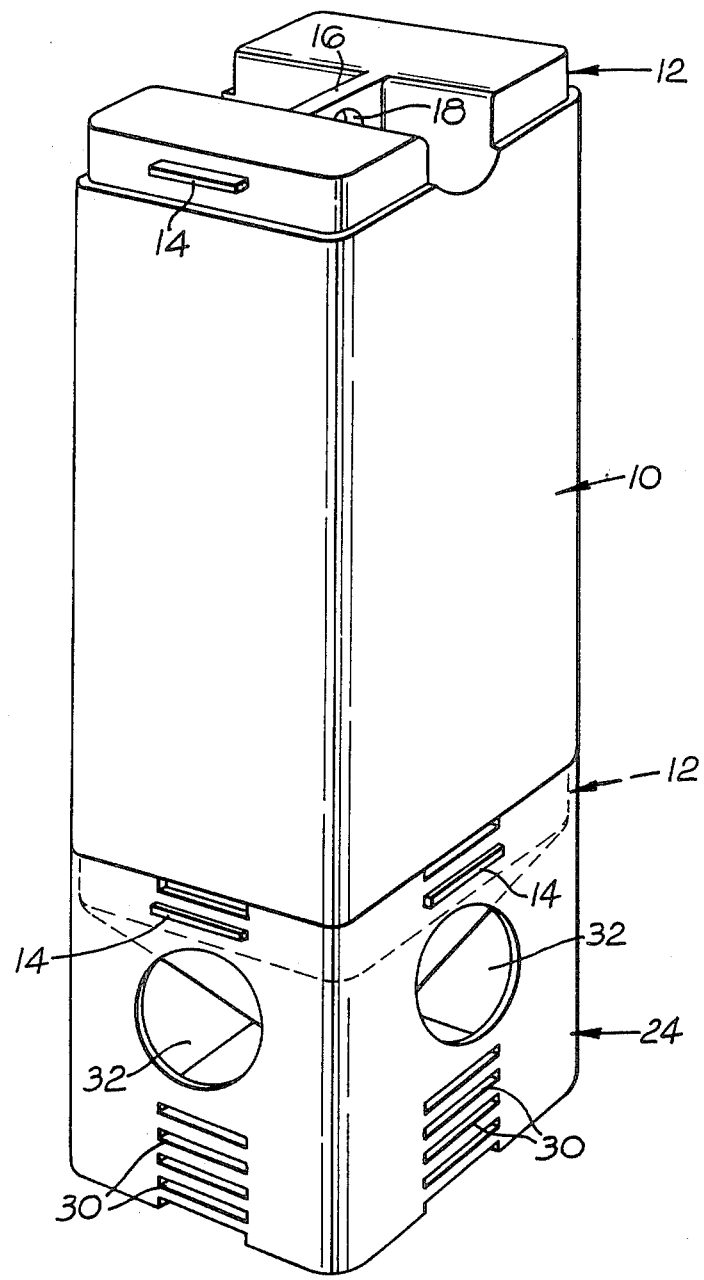
FIG. 1 is a perspective view of the bird feeder.

Referring to the drawings, the container 10 is blow moulded from a suitable plastics material, and in this illustrative embodiment is of generally square cross section. Upper and lower ends are rebated at 12 and provided with projecting ribs 14. A web 16 is provided with an eye allowing the container to be suspended from a tree for example when in use.

Figure 2:
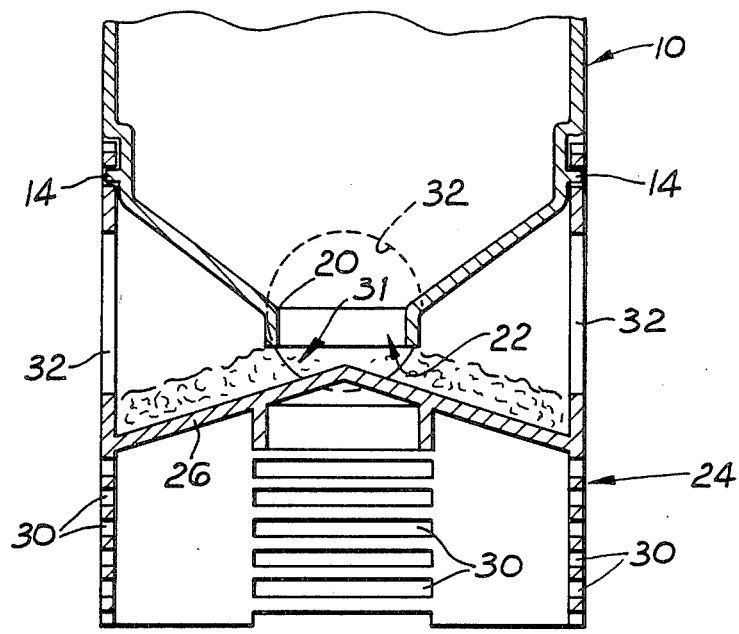
FIG. 2 is a fragmentary sectional elevation of the same with the lid in one position.
Figure 3:
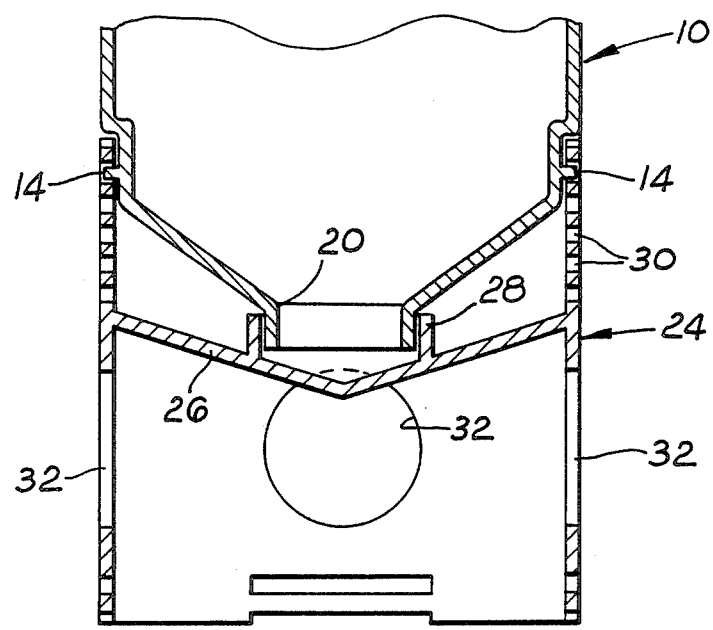
FIG. 3 is a view similar to FIG. 2 with the lid in another position.

It will be noted that the ribs 14 are provided at upper and lower ends, although the web and eye feature is only provided at the upper end. The ribs at both ends make it possible to secure containers and lids alternating in a stack as hereinbefore described. As seen in FIGS. 2 and 3, the lower end (in the illustrated position) is provided with a neck 20 terminating in an aperture 22. Since the aperture 22 is of smaller area than the cross section of the container 10, the container can be regarded as a bottle.

The lid for the container comprises a peripheral wall 24 of similar cross sectional shape and size to the container. As best seen in FIGS. 2 and 3, the peripheral wall is bridged by a partition structure comprising a cone 26 made integrally with a closure cap 28. The wall is provided with a series of slots 30 ones of which co-operate with the ribs 14 according to whether the lid is in the feed position of FIG. 2 or the closure position of FIG. 3. Due to the inherent flexibility of the blow moulded lid material, the container can be snap engaged with the container and readily disengaged when required.

In the FIG. 2 position, the cone 26 is spaced with a clearance 31 from the adjacent end of the neck of the bottle. The dimension of that clearance will depend upon the size of the seeds or other food being fed from the container. This dimension can be selected so that a loose pile of seeds accumulates which then clogs the clearance 31.

Birds gain access to the food through the relatively large apertures 32 provided around the periphery of the lid, and as they remove food from the pile resting on the cone, more food is discharged.

The lid is also provided with a closure cap 28, so that when the lid is in the FIG. 3 position, the closure cap fits closely on the neck of the bottle and prevents any loss of food, for example during storage and transport.

Additional slots 30 provide a purchase for the claws of the birds so as to act as a perch.

In a modification (not shown) the lid has an additional collar upstanding from the cone and extending past the projecting neck of the bottle in spaced relation to the neck. This may restrict the gravity flow of seeds and also enable the emptied container to be filled with water and used in the same manner, the extra collar filling with water when in the FIG. 1 position, and thus preventing air from entering the bottle except as and when water is removed from the collar.

I claim:

1. A bird food package comprising a container having an open mouth, wherein the improvement comprises a reversible lid which is securable to the container in one position in which it tightly seals the mouth of the container, said lid having a platform and being also securable to the container in a reversed position in which said platform is spaced from the mouth of the container, the lid and a major portion of the container being of the same cross-sectional shape and dimension, the lid and container being provided with co-operating means by which the lid can be snap-engaged with the container in either of the positions of the lid relative to the container, the lid having a tranversely extending partition of generally conical shape provided with a closure cap on the concave side of the partition, and the partition being asymmetrically related to the axial length of the lid so that in one position of the lid on the container the closure cap fits the container closely and in the reversed position the partition is related to the mouth of the container so as to allow flow of container content out of the mouth and down the partition.

2. A bird food package as claimed in claim 1, wherein the lid has a peripheral wall provided with a number of relatively large apertures above the partition enabling access to the interior of the lid, and located in the portion of the wall above the partition.

* * * * *